No. 727,843. PATENTED MAY 12, 1903.
W. A. L. ROBERSON, DEC'D.
R. ROBERSON, ADMINISTRATOR.
MINING MACHINE.
APPLICATION FILED SEPT. 8, 1902.
NO MODEL.
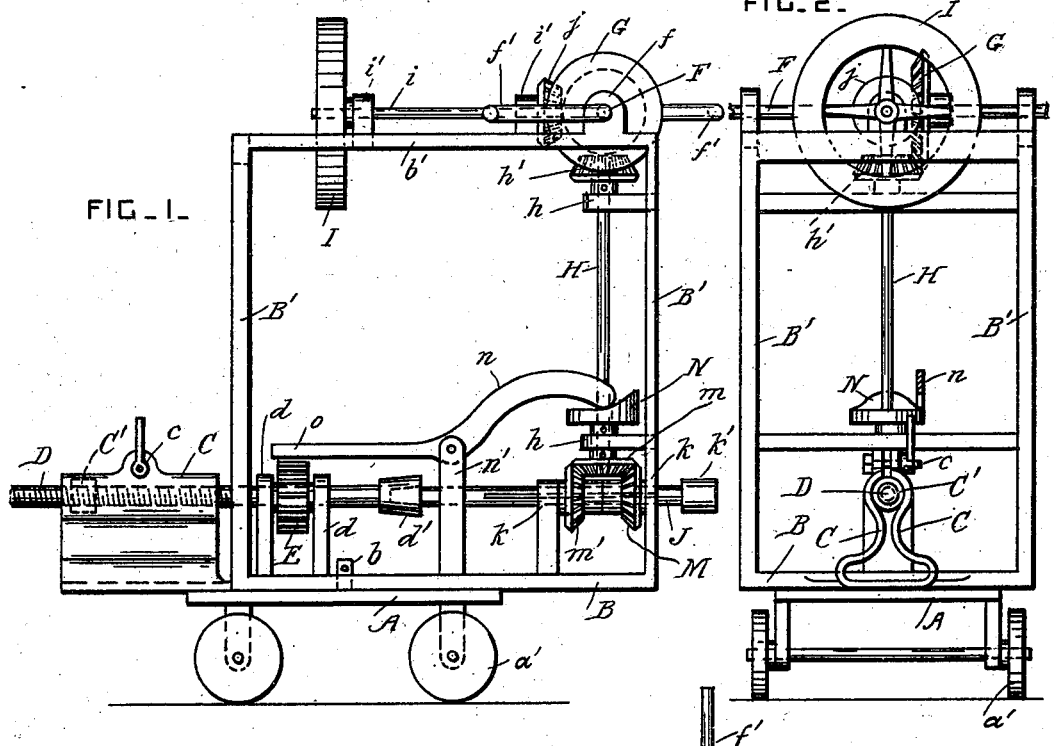
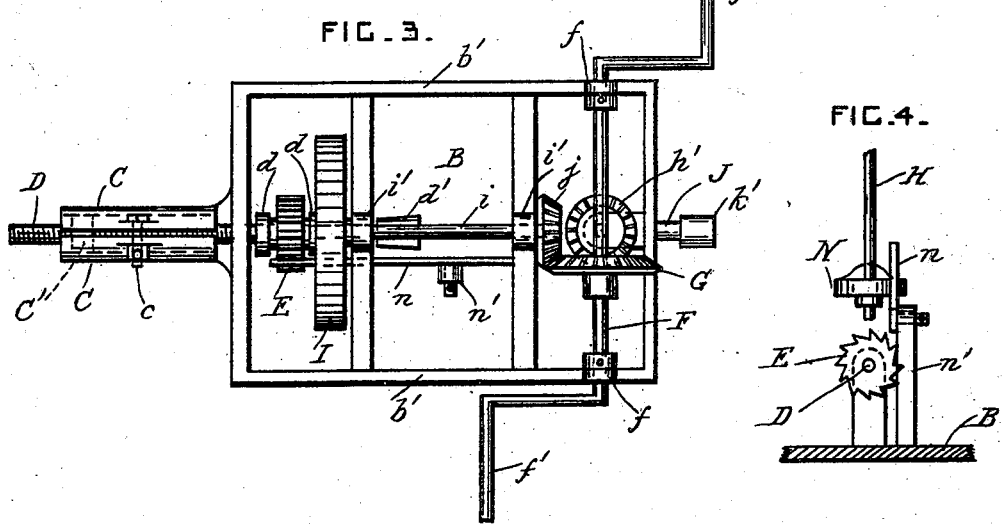
WITNESSES
Wm H. Bates
Geo. E. Poulton
INVENTOR
William A. L. Roberson
by Herbert W. T. Jenner
Attorney No. 727,843.

Patented May 12, 1903.

UNITED STATES PATENT OFFICE.

WILLIAM AMMON LEE ROBERSON, OF THACKER, WEST VIRGINIA; ROBERT ROBERSON ADMINISTRATOR OF SAID WILLIAM AMMON LEE ROBERSON, DECEASED.

MINING-MACHINE.

SPECIFICATION forming part of Letters Patent No. 727,843, dated May 12, 1903.

Application filed September 8, 1902. Serial No. 122,567. (No model.)

*To all whom it may concern:*

Be it known that I, WILLIAM AMMON LEE ROBERSON, a citizen of the United States, residing at Thacker, in the county of Mingo and State of West Virginia, have invented certain new and useful Improvements in Mining-Machines; and I do hereby declare the following to be a full, clear, and exact description of the invention, such as will enable others skilled in the art to which it appertains to make and use the same.

This invention relates to machines for mining coal and other minerals; and it consists in the novel construction and combination of the parts, hereinafter fully described and claimed.

In the drawings, Figure 1 is a side view of the mining-machine. Fig. 2 is a rear end view of the mining-machine. Fig. 3 is a plan view. Fig. 4 is a detail end view of the face-cam, ratchet-toothed wheel, and feed-lever.

A is a truck mounted on wheels $a'$.

B is the frame of the machine, mounted on an upright pivot $b$, which projects from the center part of the truck. The frame rests on the top of the truck and may be turned around in all directions. The frame is provided with uprights $B'$, and at the rear part behind the uprights it has two spring-arms C, which project rearwardly and form a convenient handle for turning the frame on its pivot.

$C'$ is a nut, which may be clamped in various positions between the spring-arms by means of a bolt $c$.

D is the feed-screw of the boring-shaft. This feed-screw engages with the nut $C'$ and is journaled in bearings $d$ on the frame. The feed-screw may be slid back quickly whenever desired by unclamping the nut and permitting it to slide in the spring-arms.

The feed-screw D is provided with a thrust-block $d'$ at its front end, and E is a ratchet-toothed wheel secured on the said feed-screw.

F is the operating-shaft of the machine, journaled in bearings $f$ at the upper part of the uprights $B'$ and provided with suitable crank-handles $f'$. A beveled toothed wheel G is secured on the shaft F.

H is a vertical shaft journaled in bearings $h$ on the frame B and having a beveled toothed pinion $h'$ secured on it and gearing into the wheel G.

I is a fly-wheel which is secured on a shaft $i$. The shaft $i$ is journaled in bearings $i'$ at the upper part of the frame B and has a beveled toothed pinion $j$ secured on it and gearing into the wheel G. The fly-wheel is arranged at the middle part of the frame, so that it is between two longitudinal bars $b'$, which form the upper part of the frame and which protect the miners from coming in contact with the fly-wheel.

J is the drill-bit shaft, journaled in two bearings $k$ on the lower part of the frame B. The rear end of the shaft J engages with the thrust-block $d'$ of the feed-screw, and its front end is provided with a socket $k'$ for the drill-bits.

Any approved drill-bits may be used, and several of different size are preferably provided.

M is a beveled toothed pinion, which is splined on the shaft J and which gears into a beveled toothed pinion $m$, secured on the lower part of the vertical shaft H. A second beveled toothed pinion $m'$ is also mounted loose on the shaft J and gears into the said pinion $m$. This pinion $m'$ does not operate to drive anything, but is provided to prevent the drill-bit shaft from bending and because it operates to make the drill-bits cut much steadier. The pinions $m$ and $m'$ are arranged between the two bearings $k$, so that they cannot move longitudinally on the shaft J.

N is a face-cam which is secured on the vertical shaft H.

A feed-lever $n$ is pivoted to a bracket $n'$ on the frame B. One end of this lever is operated by the face-cam N, and its other end $o$ operates the ratchet-toothed wheel E, being arranged over it to one side of the feed-screw, so that the ratchet-toothed wheel is partially revolved each time the feed-lever is moved by the face-cam. The feed-lever returns to its original position automatically by gravity, or it may be moved by a spring, and in this manner the drill-bit is fed forward step by step automatically as the drill-bit shaft is revolved.

What I claim is—

1. In a mining-machine, the combination, with a frame provided with separable arms at its rear end, a nut slidable longitudinally in the said arms, and means for clamping the nut between the said arms; of a feed-screw engaging with the said nut, and drilling mechanism carried by the said frame and operatively connected with the said feed-screw, substantially as set forth.

2. In a mining-machine, the combination, with a truck, of a frame pivoted thereon and provided with projecting arms at its rear end by means of which it may be turned around on the truck, drilling mechanism carried by the said frame, and a feed-screw and a nut carried by the said arms and operatively connected with the said drilling mechanism, substantially as set forth.

3. In a mining-machine, the combination, with a frame, of a drill-bit shaft journaled longitudinally in the frame, a vertical shaft journaled in the frame, beveled toothed wheels operatively connecting the two said shafts, an operating-shaft journaled crosswise in the frame, beveled toothed wheels connecting the said vertical and operating shafts, a fly-wheel shaft provided with a fly-wheel and journaled in the said frame over the said drill-bit shaft, and a beveled toothed wheel connecting the fly-wheel shaft with the beveled toothed wheel on the said operating-shaft, said frame being provided with bars at its upper part on each side of the said fly-wheel, substantially as set forth.

4. In a mining-machine, the combination, with a frame provided with two bearings, and a drill-bit shaft journaled in the said bearings; of a beveled toothed pinion splined to the said shaft, a second beveled toothed pinion mounted loose on the said shaft, said pinions being arranged between the two said bearings, and a vertical driving-shaft journaled in the said frame and provided with a beveled toothed pinion which gears into both of the aforesaid pinions, substantially as set forth.

5. In a mining-machine, the combination, with a frame, of a drill-bit shaft journaled in the said frame, a nut supported by the said frame, a feed-screw engaging with the said nut and operatively connected with the said shaft, a ratchet-toothed wheel secured on the said feed-screw, a vertical driving-shaft, a face-cam secured on the said driving-shaft, beveled toothed wheels operatively connecting the two said shafts, and a pivoted feed-lever having one end operated by the said face-cam and having its other end arranged to one side of the said feed-screw and operating the said ratchet-toothed wheel periodically, substantially as set forth.

In testimony whereof I affix my signature in presence of two witnesses.

WILLIAM AMMON LEE ROBERSON.

Witnesses:
L. HARRISON,
FELIX WATSON.